(12) United States Patent
Pechanek et al.

(10) Patent No.: US 8,484,444 B2
(45) Date of Patent: Jul. 9, 2013

(54) METHODS AND APPARATUS FOR ATTACHING APPLICATION SPECIFIC FUNCTIONS WITHIN AN ARRAY PROCESSOR

(75) Inventors: Gerald George Pechanek, Cary, NC (US); Mihailo Stojancic, San Jose, CA (US)

(73) Assignee: Altera Corporation, San Jose, CA (US)

( * ) Notice: Subject to any disclaimer, the term of this patent is extended or adjusted under 35 U.S.C. 154(b) by 146 days.

(21) Appl. No.: 13/037,824

(22) Filed: Mar. 1, 2011

(65) Prior Publication Data

US 2011/0153998 A1  Jun. 23, 2011

Related U.S. Application Data

(63) Continuation of application No. 11/736,788, filed on Apr. 18, 2007, now Pat. No. 7,971,036.

(60) Provisional application No. 60/795,140, filed on Apr. 26, 2006.

(51) Int. Cl.
*G06F 9/312* (2006.01)
*G06F 15/80* (2006.01)

(52) U.S. Cl.
USPC ............................... 712/225; 712/11; 712/17

(58) Field of Classification Search
USPC ............................... 712/225, 11, 17, 214, 220
See application file for complete search history.

(56) References Cited

U.S. PATENT DOCUMENTS

| 4,761,733 | A | * | 8/1988 | McCrocklin et al. | 711/212 |
|---|---|---|---|---|---|
| 4,811,007 | A | * | 3/1989 | Schreiber | 345/545 |
| 5,892,965 | A | * | 4/1999 | Miura et al. | 712/34 |
| 6,065,087 | A | * | 5/2000 | Keaveny et al. | 710/315 |
| 6,351,800 | B1 | * | 2/2002 | Martin et al. | 712/36 |
| 6,526,430 | B1 | * | 2/2003 | Hung et al. | 708/523 |
| 6,694,385 | B1 | * | 2/2004 | Fuoco et al. | 710/8 |
| 6,807,191 | B2 | * | 10/2004 | Fujii et al. | 370/464 |

OTHER PUBLICATIONS

Patterson et al., "Computer Architecture A Quantitative Approach", Section 8.1, 1996.*
Vijay Sadananda Pai, "Processor memory unit", Aug. 1997.*

* cited by examiner

*Primary Examiner* — Aimee Li
(74) *Attorney, Agent, or Firm* — Law Offices of Peter H. Priest, PLLC

(57) ABSTRACT

A multi-node video signal processor ($VSP_N$) is describes that tightly couples multiple multi-cycle state machines (hardware assist units) to each processor and each memory in each node of an N node scalable array processor. $VSP_N$ memory hardware assist instructions are used to initiate multi-cycle state machine functions, to pass parameters to the multi-cycle state machines, to fetch operands from a node's memory, and to control the transfer of results from the multi-cycle state machines.

20 Claims, 5 Drawing Sheets

Load Hardware Assist (LHA): Encoding

Syntax/Operation

| Instruction | Operands | Operation |
|---|---|---|
| Load Compute Register | | |
| LHA.[SP].D | Rte, An, ±RzAz | HARae ← An<br>An ← An ± (RzAz * 8)$_{dword}$ (post update)<br>HARao ← CRFRxe if Rz/Az=0<br>HARao ← CRFRx if Rz/Az=1 |
| LHA.[SP].W | Rt, An, ±RzAz | HARae ← An<br>An ← An ± (RzAz * 4)$_{word}$ (post update)<br>HARao ← CRFRxe if Rz/Az=0<br>HARao ← CRFRx if Rz/Az=1 |
| LHA.[SP].H0 | Rt, An, ±RzAz | HARae ← An<br>An ← An ± (RzAz * 2)$_{hword}$ (post update)<br>HARao ← CRFRxe if Rz/Az=0<br>HARao ← CRFRx if Rz/Az=1 |
| LHA.[SP].B0 | Rt, An, ±RzAz | HARae ← An<br>An ← An ± RzAz$_{byte}$ (post update)<br>HARao ← CRFRxe if Rz/Az=0<br>HARao ← CRFRx if Rz/Az=1 |
| T.LHA.[SP].[DWH0B0] | Rt, An, ±RzAz | Do operation only if T condition is satisfied in F0 |

F0 ← logical OR of F1-F7
F1 ← HA-1 operation is complete
F2 ← HA-2 operation is complete
:
F7 ← HA-7 operation is complete

Fig. 3B

METHODS AND APPARATUS FOR ATTACHING APPLICATION SPECIFIC FUNCTIONS WITHIN AN ARRAY PROCESSOR

RELATED U.S. APPLICATION DATA

The present application is continuation of U.S. Ser. No. 11/736,788 filed on Apr. 18, 2007 and claims the benefit of U.S. Provisional Application No. 60/795,140, filed Apr. 26, 2006 which are incorporated by reference herein in its entirety.

FIELD OF THE INVENTION

The present invention relates generally to improvements in parallel data processing architectures for video processing and more particularly to apparatus and methods for attaching application specific functions within an array processor.

BACKGROUND OF THE INVENTION

Increasing demand for high definition TV products, including interactive TV in a HD format and HD video compression encoding and decoding, requires increasing sophistication, flexibility, and performance in the supporting electronics. The sophistication, flexibility, and performance requirements for HD TV exceeds the capabilities of current generations of processor architectures by, in many cases, orders of magnitude.

The demands of video encoding for HD formats are both memory and data processing intensive, requiring efficient and high bandwidth memory organizations coupled with compute intensive capabilities. In addition, a video encoding product must be capable of supporting multiple standards each of which includes multiple optional features which can be supported to improve image quality and further reductions in compression bandwidth. Due to these multiple demands, a flexible parallel processing approach must be found to meet the demands in a cost effective manner.

A number of algorithmic capabilities are generally common between multiple video encoding standards, such as MPEG-2, H.264, and SMPTE-VC-1. Motion estimation/compensation and deblocking filtering are two examples of general algorithms that are required for video encoding. To efficiently support motion estimation algorithms and other complex programmable functions which may vary in requirements across the multiple standards, a processor by itself would require significant parallelism and very high clock rates to meet the requirements. A processor of this capability would be difficult to develop in a cost effective manner for commercial products.

An array processor typically requires short pipelines to minimize the complexity of having a large number of processor elements on a single chip. The short pipelines will typically have a minimum number of execution stages, such as a single execution stage or two to four execution stages, since each pipeline stage adds complexity to the processor element and the array processor. As a consequence, simple execution functions are typically defined in the array processor instruction set architecture.

In addition to pipeline control, there are other complexities in an array processor. For example, to meet performance requirements the array processor may need to have a large number of processor elements on a single chip. A large number of processor elements typically limits the operational clock rate due to chip size and wire length constraints. Even when more complex instruction execution functions are defined, such as adding a two-cycle execution function instead of a single cycle execution function, the complex instructions are defined within the constraint of the processor architecture. The more complex functions will typically utilize architectural features in the same manner as the simple execution functions. For example, the fetching of source operands for the more complex function will be accomplished in the same manner as the simpler functions. In a reduced instruction set computer (RISC) processor, the source operands are provided from a central register file and this access method will be used by the more complex function to maintain the programming model for the new instructions added. For memory intensive functions and functions of greater complexity, these standard approaches are inadequate.

SUMMARY OF THE INVENTION

In one or more of its several aspects, the present invention addresses problems such as those described above. In one of its aspects, the present invention describes an apparatus that tightly couples a memory hardware assist unit to each processor and memory node of a scalable array processor.

In one aspect of one embodiment of the present invention an apparatus is described for providing a memory assist function. At least one processing element (PE) and at least one memory directly associated with the at least one PE are used. An instruction decode function decodes a memory hardware assist instruction that is an instruction in the instruction set architecture of the at least one processing element and causes control signals to be generated to initiate the memory hardware assist function. A memory hardware assist unit having a memory interface to the at least one memory and a PE interface to the at least one PE, the memory hardware assist unit, after being initiated, iteratively fetches source operands over the memory interface from the at least one memory in parallel with PE operations in the at least one PE and generates at least one result operand that is selectively stored over the memory interface in the at least one memory.

In another embodiment of the present invention a method for providing a multi-cycle memory assist function is described. Receiving a hardware assist instruction in at least one processing element (PE) having an attached multi-cycle memory hardware assist unit and a memory directly associated with the at least one PE. Decoding in the PE a memory hardware assist instruction that is an instruction in the instruction set architecture of the at least one processing element to generate control signals that initiate the multi-cycle memory assist function in the multi-cycle memory hardware assist unit. Generating a memory address to be used in the multi-cycle memory hardware assist unit, wherein the memory address is the start address of source operands to be fetched from the memory associated with the multi-cycle memory hardware assist unit These and other features, aspects. techniques and advantages of the present invention will be apparent to those skilled in the art from the following detailed description, taken together with the accompanying drawings and claims.

BRIEF DESCRIPTION OF THE DRAWINGS

FIG. 3B illustrates a syntax and operation description table for the LHA instruction in accordance with the present invention.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
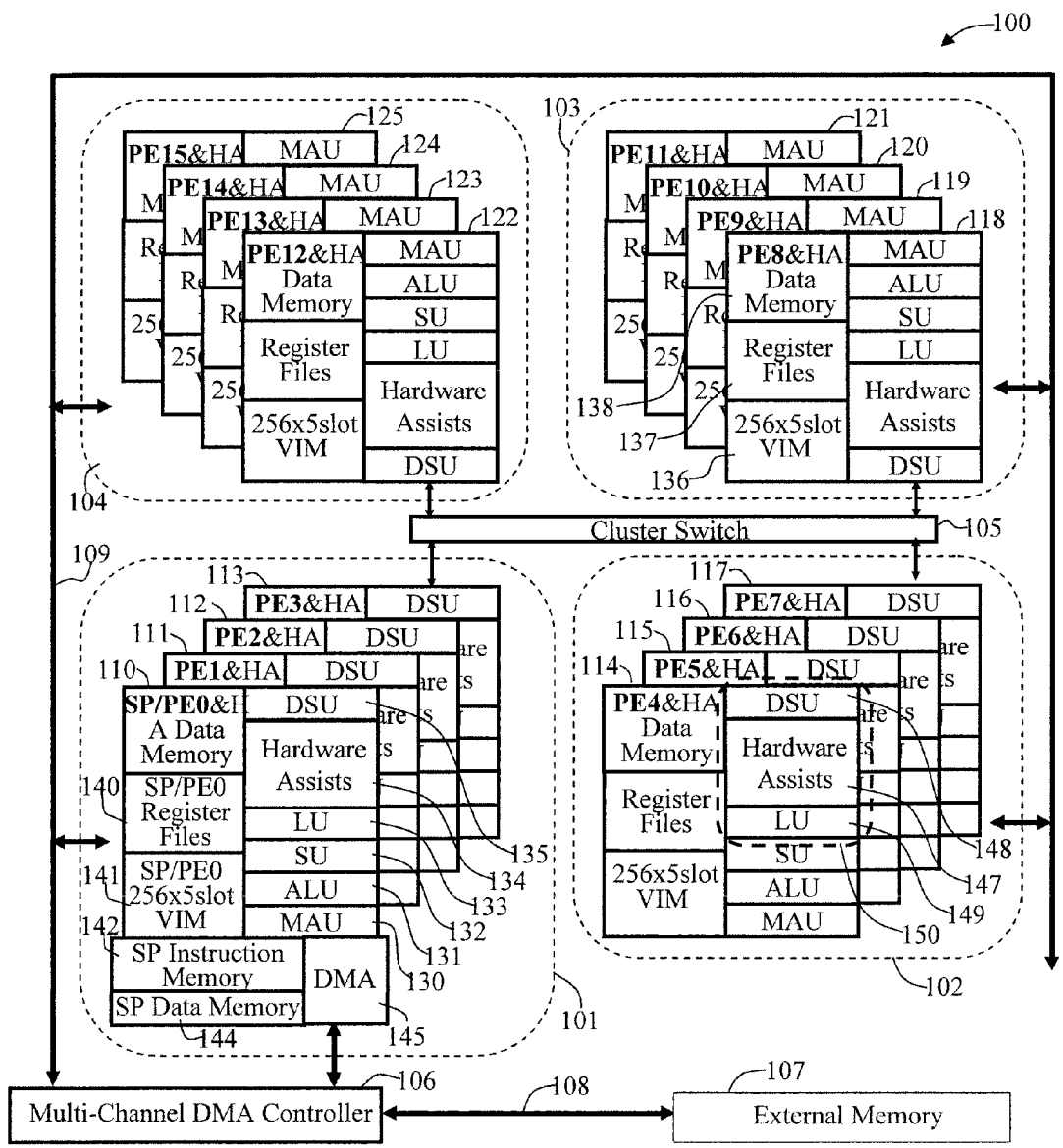
FIG. 1 illustrates a sixteen node video-specific processor (VSP$_{16}$) in accordance with one or more embodiments of the present invention.

FIG. 1 illustrates a sixteen-node video signal processor ($VSP_{16}$) 100 in accordance with one or more embodiments of the present invention. The $VSP_{16}$ 100 contains four transform engine (TE) clusters 101-104, an interconnection network cluster switch 105, a multi-channel direct memory access (DMA) controller 106, and an external memory 107. The DMA controller 106 interfaces with the external memory 107 over an external memory bus 108 to transfer data to and from the external memory to each of the TE clusters over a multi-channel DMA bus 109.

Sixteen processor engines (PEs) 110-125 are partitioned in groups of four PEs per cluster as a 4×4 array organization. Each PE provides programmable processing and hardware assist functions. SP/PE0 110 is unique as compared to the other fifteen PEs 111-125, having an array controlling function combined with the PE function of PE0. The common features of the sixteen PEs 110-125 include a set of instruction execution units including a multiply accumulate unit (MAU) 130, an arithmetic logic unit (ALU) 131, a store unit (SU) 132, a load unit (LU) 133, a hardware assist (HA) 134, a data select unit (DSU) 135, a 256×5 slot very long instruction word memory (VIM) 136, a local PE register file 137, and a data memory 138 local to each PE and HA. Each PE also contains local pipeline controls, decode logic, and control logic appropriate for each PE. All $VSP_{16}$ instructions are executed in a simple pipeline with a majority of instructions requiring a single execution stage and a few instructions requiring two execution stages that are pipelined.

The unique SP/PE0 110 combines a controlling function sequence processor (SP) combined with PE0 functions. To support the SP and PE0, a separate SP register file and a separate PE0 register file, illustrated in one block as SP/PE0 register files 140 are used to maintain the processing context of the SP and PE0. Though not limited to this, the SP/PE0 shares a single VIM 141. To control the $VSP_{16}$ the SP has a single thread of control supported by an SP instruction memory 142 and an SP data memory 144. The SP provides program control, contains instruction and data address generation units, supports interrupts, provides DMA control, and dispatches instructions to the PEs 110-125. The SP executes branches and controls the fetching an issuing of instructions, such as load VLIW and execute VLIW instructions. The load VLIW instruction provides an indirect VIM address and is used to load the instruction slots at the specified VIM address. The execute VLIW instruction causes a VLIW to be selected at a specified indirect VIM address and executed.

The single SP thread of control supports 4×4 sub-threads which operate synchronously in lock step single instruction multiple data (SIMD) fashion. Each sub-thread uses very long instruction words (VLIWs) which are indirectly selected and executed by the single SP thread. Each VLIW in each PE at the same VIM address may be different but all unmasked PEs access the same VIM address when executing a VLIW. Five 32-bit instruction slots are provided in each PE, such that with 16 PEs 80 32-bit instructions can execute simultaneously. In addition single, dual, quad, and octal packed data operations may be specified independently by each slot instruction thereby supporting up to 8*80=640 instruction specified operations per cycle. As an example of the processing power this provides, a $VSP_{16}$ operating at 250 Mhz may achieve 640*250 Mhz=160 Giga operations per second.

The $VSP_{16}$ processor also uses an interconnection network cluster switch 105 providing single cycle data transfers between PEs within clusters and between PEs in orthogonal clusters. The communication operations are controlled by a DSU instruction which can be included in a VLIW thereby overlapping communications with computations which with proper software pipelining the communication latency can be reduced to zero. The communication operations operate independently of the DMA which may operate in the background to stream data between the local PE memories and the external memories.

To support additional processing capability for application specific functions such as motion estimation/compensation, deblocking filters, and other high compute functions, a hardware assists unit (HAU) with advantageous separate connections to local PE memory is provided. A HAU has one or more multi-cycle tightly coupled state machine functions which provide memory intensive application specific operational capability to each of the PEs in the $VSP_{16}$. To provide a scalable mechanism for adding multiple HAUs, a novel tightly coupled interface is provided by the load unit (LU) and data select unit (DSU) of each PE. For example, HAU 147 interfaces with DSU 148 and LU 149 and the local data memory associated with PE4 114 as a transform engine 150.

Figure 2:
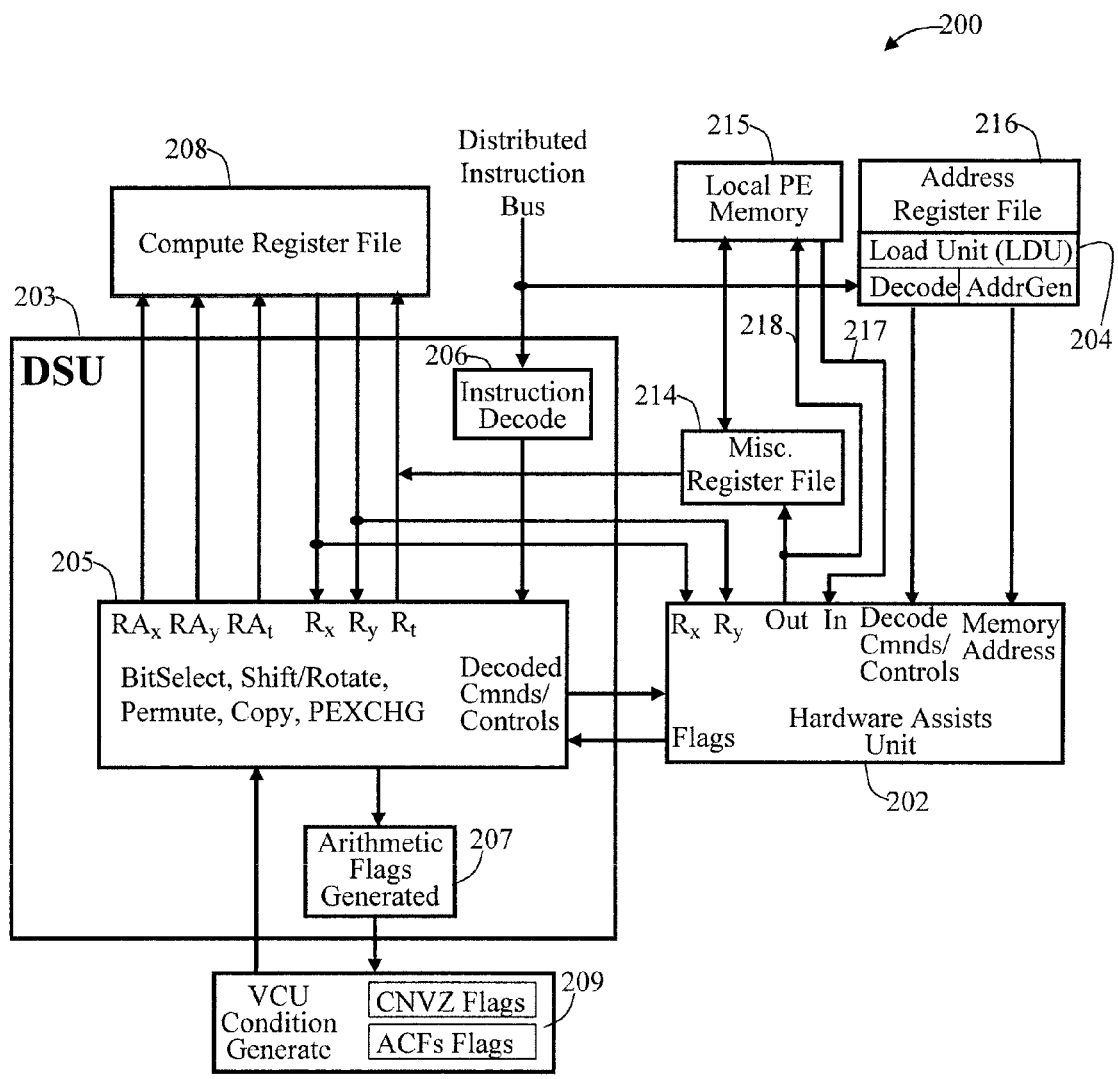
FIG. 2 illustrates a transform engine (TE) as a combined instruction and assist function in accordance with a number of embodiments of the present invention.

FIG. 2 illustrates a transform engine (TE) subsystem 200 as a combined instruction execution and hardware assist function in accordance with a number of embodiments of the present invention. The TE subsystem 200 includes a hardware assists unit (HAU) 202 that interfaces with a data select unit (DSU) 203, local PE memory 215, and load unit (LU) 204. The DSU 203 has an instruction execution unit 205, an instruction decode function 206, and an arithmetic flags generated function 207. The DSU 203 interfaces with a compute register file 208 of a PE and a VLIW control unit (VCU) condition generate function 209. The HAU 202 fetches data from the local PE memory 215 over an input data path 217. The HAU 202 generates results which may be stored over out data path 218 in a miscellaneous register file (MRF) 214 or in the local PE data memory 215. The instruction execution unit 205 supports the execution of bit select, shift/rotate, permute, copy, pexchange, and the like DSU instructions. DSU instructions may execute in parallel while the HAU 202 is operating. The load unit 204 supports the execution of direct, indirect, broadcast and the like LU instructions used primarily for loading data from memory to a compute register file, address register file 216, miscellaneous register file 214, hardware assist registers internal to the HAU 202, and the like. LU and DSU instructions may execute in parallel while HAU 202 is operating.

Figure 3A:
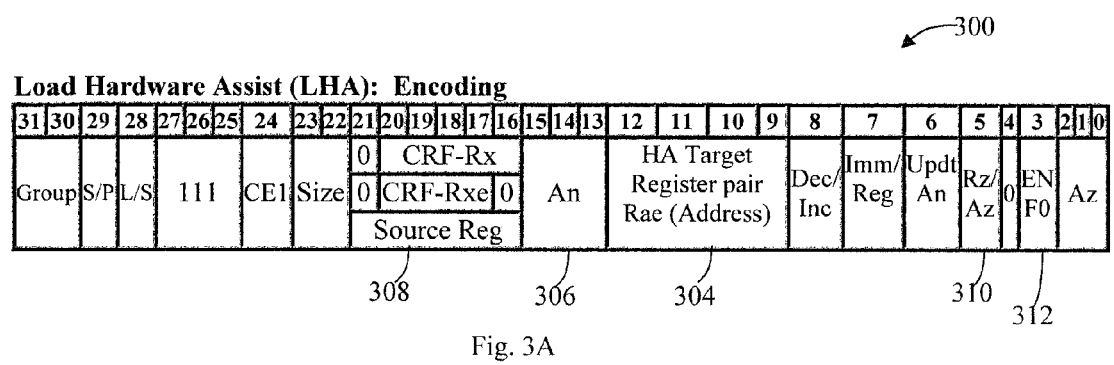
FIG. 3A illustrates a load hardware assist (LHA) instruction format in accordance with the present invention.

FIG. 3A illustrates a load hardware assist (LHA) instruction format 300 in accordance with the present invention.

Operations in the HAU 202 may be initiated by use of an LU instruction or a DSU instruction.

FIG. 3B illustrates a syntax and operation description table 350 for the LHA instruction in accordance with the present invention. Reference to elements of the TE subsystem 200 in FIG. 2 and the bit fields of the LHS instruction format 300 of FIG. 3 are included as representative of elements and bit fields used in the operation of TE subsystems of other PEs in the $VSP_{16}$. A load HA (LHA) instruction causes an address value for a byte, halfword, word or doubleword to be loaded into the Hardware Assist Unit (HAU) 202 even target register Rae as specified in bit field 304 from an address generation function in LDU 204. Source address register An 306 selected from address register file 216 contains a base address. CRF register Rx selected from CRF 208 as specified in bit field 308 is also transferred to the HAU 202 into an odd target register Rao associated with Rae as specified in bit field 304. If bit 5 Rz/Az 310 is enabled for Rz (Rz/Az=0) then the CRF bit field 308 specifies an even/odd register pair where the compute register Rz=Rxo contains the unsigned index of the address and Rxe is loaded into HA Rao. If bit 5 Rz/Az 310 is enabled for Az (Rz/Az=1) then the CRF bit field 308 specifies a 32-bit register Rx to be loaded into HAU 202 Rao and address register Az contains the unsigned index of the address. The index can be specified to be added to or subtracted from the base address. Bit 3 (En F0) 312 enables the setting of a PE's arithmetic condition flag (ACF) F0 upon completion of a hardware assist function, as an OR of hardware assist function flags on completing execution. The enable bit may also enable any hardware assist unit, such as hardware assist units HA1, HA2, and HA3, to store a corresponding ACF flag. For example, HA1 is enabled to set F1, HA2 to set F2, HA3 to set F3 with HA1 OR HA2 OR HA3 setting the F0 flag. It is noted that the $VSP_{16}$ processor supports unaligned data accesses. Doublewords, words, halfwords and bytes may be accessed at any byte address. The LHA instruction as illustrated in LHA instruction format 300 executes in a single cycle.

Figure 4:
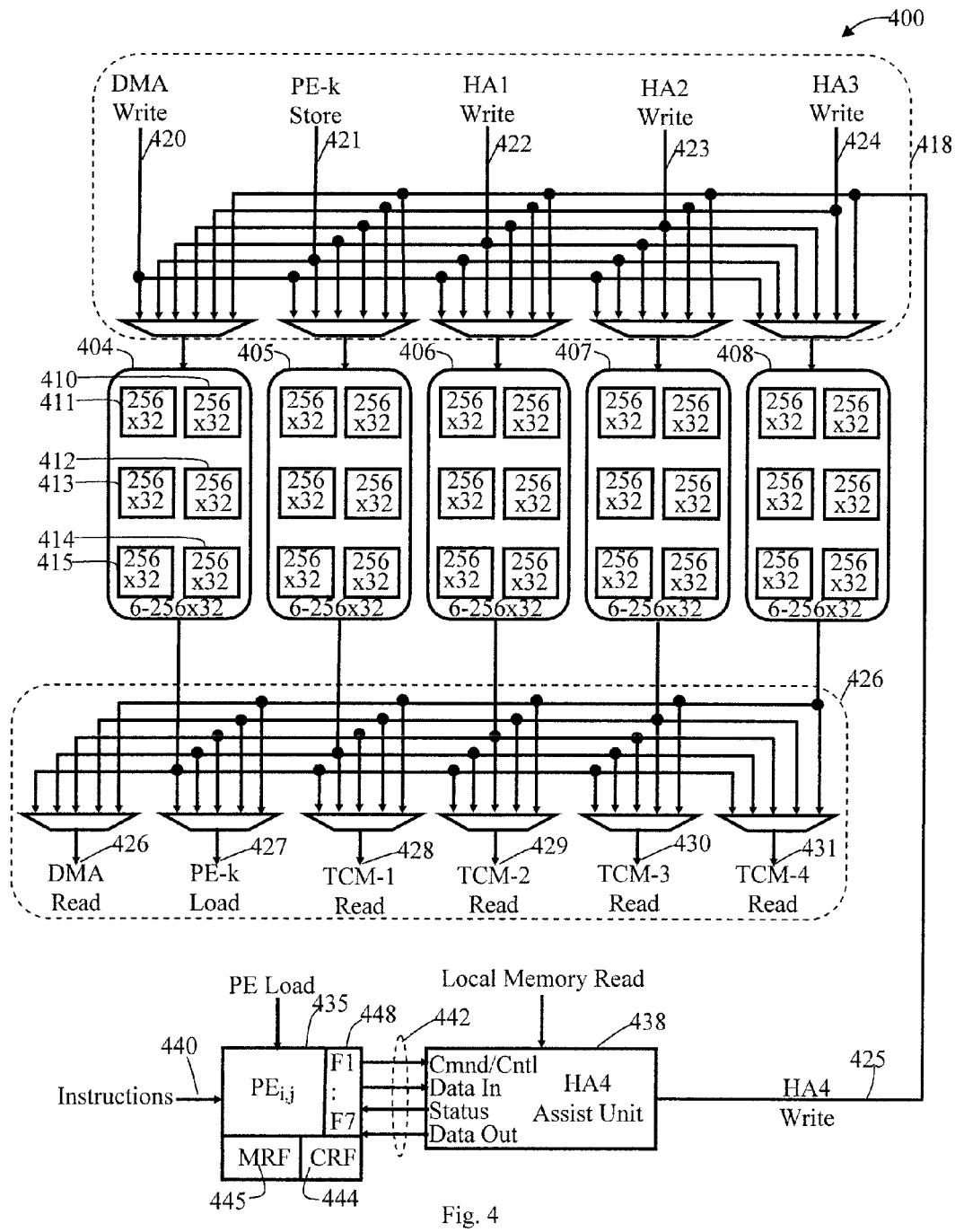
FIG. 4 illustrates an exemplary hardware assist memory organization in accordance with the present invention.

FIG. 4 illustrates an exemplary hardware assist (HA) memory organization 400 in accordance with the present invention. The HA memory organization 400 contains at least two memory blocks, such as memory block 404 and 405 providing support for a local PE memory and a HA memory. In the exemplary HA memory organization 400, five memory blocks 404-408 are shown, supporting a local PE 435 and four hardware assist units, such as HA4 438. Each of the five memory blocks 404-408 is made up of multiple smaller blocks of memory. For example, memory block 404 is made up of six 256×32 blocks 410-415. For different video algorithms, the precision of pixel values may vary. For example, 8-bit, 10-bit, and 12-bit pixel values may be used. In the five memory blocks 404-408 a common memory organization is assumed to allow PE load and store accessibility to each memory block. With PE data types of 8-bit, 16-bit, 32-bit, and 64-bit for example, two of the six memory blocks can be accessed to support 64-bit packed data load and store operations. For 10-bit pixels, hardware assists can access five 256×32 memory blocks to obtain sixteen 10-bit pixels. For 12-bit pixels, hardware assists can access three 256×32 memory blocks to obtain eight 12-bit pixels. Other variations are feasible, such as using K×8 memory blocks, for example, where K is application dependent. For 10-bit and 12-bit pixels, the PE could operate on the data using 16-bit data types or additional data types can be added to the instruction set architecture allowing the PEs to directly operate on packed 10-bit and 12-bit pixels.

Write multiplexing 418 is shown for the five memory blocks 404-408 including support for direct memory assist (DMA) write 420, PE store 421, and, for example, four hardware assist write operation paths 422-425. An exemplary fourth hardware assist write unit HA4 438 may also use a path to a PE compute register file 444 or miscellaneous register file 445, for example, for result storage. Read multiplexing 426 is shown for six units including DMA read 426, PE load 427, and for example, four hardware assist read operations 428-431. A PE 435 initiates operations on a hardware assist unit, such as HA unit 438, when the PE 435 receives a hardware assist instruction 440. The PE 435 interfaces with the HA unit 438 through a command and data interface 442. Examples of command/controls include unique decode control signals that select a HA unit from a grouping of multiple HA units. Examples of data that may be used on the command and data interface 442 include a start address for HA memory operations, HA parameter control such as stride and hold specification, block size, and type of operations which more suitably are provided through register passing from the PE 435 compute register file 444. The hardware assist units provide their own state machine control for memory addressing as initiated and controlled by the PE and operate independently of the PE once operations have been started. Status of hardware assist operations may include the setting of arithmetic control flags (ACFs) F1-F7 flags 448, such as setting F1 when HA-1 operation is complete, setting F2 when HA-2 operation is complete, . . . , setting F7 when an HA-7, if used, operation is complete and setting F0 as a logical OR of the F1-F7 flags 448.

While the present invention has been disclosed in the context of various specific illustrative embodiments, it will be recognized that the invention may be suitably applied to other environments and applications consistent with the claims which follow.

We claim:

1. An apparatus comprising:
    a plurality of data memories, wherein each data memory of the plurality of data memories comprises a plurality of memory blocks;
    a processing element (PE) directly coupled to read and write multiplexors for the plurality of data memories by a first bus for load and store accessibility of data in the plurality of memory blocks and directly coupled to an instruction bus; and
    a hardware assist (HA) unit directly coupled to the read and write multiplexors for the plurality of data memories by a second bus for read and write operations on the data from the plurality of memory blocks and directly coupled to the PE by a third bus, wherein, in response to an instruction received in the PE from the instruction bus, a memory address and control information are transferred in parallel from the PE to the HA unit over the third bus to initiate a HA compute function on memory data transferred from the plurality of memory blocks over the second bus.

2. The apparatus of claim 1, wherein the PE comprises:
    an address register file from which the memory address is read for transfer to the HA unit; and
    a register from which the control information is read for transfer to the HA unit.

3. The apparatus of claim 1, wherein the HA unit comprises:
    a multi-cycle state machine which is initiated for the HA compute function in response to the memory address and the control information received in the HA unit.

4. The apparatus of claim 3, wherein the multi-cycle state machine is operable to fetch a block of pixel data from the plurality of memory blocks beginning at the memory address and is configured to operate on the memory data in response to the HA compute function.

5. The apparatus of claim 3, wherein the multi-cycle state machine is operable to fetch data from the plurality of memory blocks according to a stride addressing parameter determined from the control information.

6. The apparatus of claim 3, wherein the multi-cycle state machine is operable to provide an indication to the PE that the HA compute function has completed.

7. The apparatus of claim 1, wherein the PE is operable to access data from the plurality of memory blocks in power of two data widths and the HA unit accesses packed pixel data from the plurality of memory blocks wherein each packed pixel has a data width that is not a power of two.

8. The apparatus of claim 1, wherein the HA unit is operable to access two 32-bit data values from the plurality of memory blocks to operate on eight 8-bit pixel data values.

9. The apparatus of claim 1, wherein the HA unit is operable to access five 32-bit data values from the plurality of memory blocks to operate on sixteen 10-bit pixel data values.

10. The apparatus of claim 1, wherein the HA unit is operable to access three 32-bit data values from the plurality of memory blocks to operate on eight 12-bit pixel data values.

11. An apparatus comprising:
plurality of data memories, wherein each data memory of the plurality of data memories comprises a plurality of memory blocks;
a processing element (PE) directly coupled to read and write multiplexors for the plurality of data memories by a PE memory bus for load and store accessibility of data in the plurality of memory blocks and each PE directly coupled to an instruction bus; and
a hardware assist (HA) unit directly coupled to the read and write multiplexors for the plurality of memories by a HA memory bus for read and write operations on the data from the plurality of memory blocks and directly coupled to the PE by a PE HA bus for transfer of information from the PE to control HA operations in response to an instruction received in the PE from the instruction bus, wherein data are loaded to the plurality of memory blocks from a multi-channel direct memory access (DMA) bus that is directly coupled to the read and write multiplexors for transfers to and from an external memory.

12. The apparatus of claim 11, wherein the plurality of memories, the PE, and the HA unit comprise a transfer engine and wherein the transfer engine is duplicated one or more times to create an array of two or more transfer engines that receives instructions from the instruction bus in each PE to control operations on each PE and on each corresponding HA unit directly coupled to each PE.

13. The apparatus of claim 12, wherein each PE in each transfer engine is operable to access data from the plurality of memory blocks coupled therewith in power of two data widths and each HA unit in each transfer engine accesses packed pixel from the plurality of memory blocks directly coupled therewith wherein each packed pixel has a data width that is not a power of two.

14. The apparatus of claim 12, wherein each HA unit in each transfer engine comprises:
a multi-cycle state machine initiated by a HA instruction received in parallel in each PE to iteratively fetch data from the plurality of memory blocks directly coupled therewith and operate on the fetched data.

15. The apparatus of claim 11, wherein a HA instruction received in the PE over the instruction bus causes the information including a start address for HA memory operations, wherein the start address is generated in the PE to be sent to the HA unit coupled therewith.

16. The apparatus of claim 11, wherein the HA unit generates a result that is selectively stored in the PE directly coupled therewith.

17. A method comprising:
receiving in a plurality of processing elements (PEs) a sequence of instructions that includes a hardware assist (HA) instruction, wherein each PE executes the HA instruction to initiate a multi-cycle compute function operable in a plurality of HA units, wherein each HA unit is directly coupled to a corresponding PE by a separate PE HA bus; and
operating on packed pixel data fetched from a plurality of memories in response to the initiated multi-cycle compute function, wherein each memory of the plurality of memories is directly coupled to read and write multiplexors for a corresponding HA unit by a separate HA memory bus, wherein each memory of the plurality of memories comprises a plurality of memory blocks that store the packed pixel data, and wherein each HA unit operates on the fetched packed pixel data in parallel with the plurality of PEs executing the sequence of instructions.

18. The method of claim 17, wherein a memory address and control information are used to initiate the multi-cycle compute function and are transferred in parallel to each HA unit in response to the HA instruction.

19. The method of claim 17, wherein each PE executes a different HA instruction to initiate a different multi-cycle compute function operable in a plurality of second HA units, wherein each second HA unit is directly coupled to a corresponding PE and directly coupled to a corresponding plurality of read and write multiplexors.

20. The method of claim 19, wherein each of the second HA units operates in parallel with each of the HA units.

* * * * *